Nov. 29, 1938.       J. J. HARKINS       2,138,524
EDUCATIONAL GAME
Filed Jan. 12, 1938
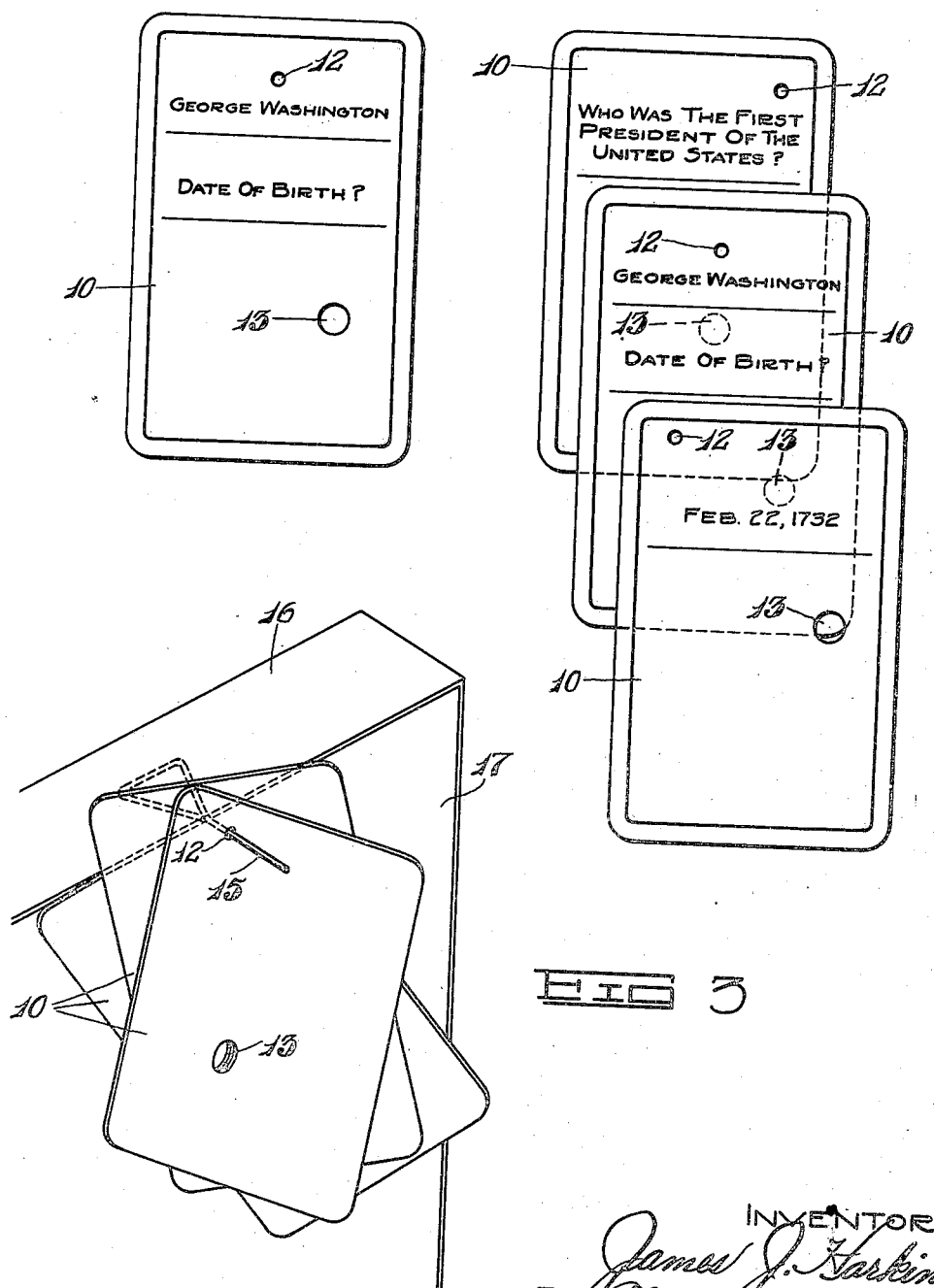

Patented Nov. 29, 1938

2,138,524

UNITED STATES PATENT OFFICE 2,138,524

EDUCATIONAL GAME

James J. Harkins, Wheeling, W. Va.

Application January 12, 1938, Serial No. 184,608

1 Claim. (Cl. 35—9)

This invention relates broadly to educational games, and more particularly to a game whereby instruction in history, geography, religion, sports, and the like may be afforded.

One of the objects of the invention is to provide a game which, while instructive and educational, is at the same time entertaining and amusing, thus appealing to adults as well as children.

Another object of the invention is to provide a game played by the question and answer method, the accuracy of the answers being proved or disproved in a unique and novel manner.

Other and further objects of the invention will appear from the detailed description which follows. In describing the invention in detail, reference is herein had to the accompanying drawing, in which Figure 1 is a face view of one of the series of cards with which the game is played;

Figure 2 is a face view of a plurality of the cards arranged as when playing the game; and Figure 3 is a perspective view of a plurality of the cards illustrating the manner of proving or disproving the correctness of the answers.

The game is played with a plurality of cards 10 similar to that depicted in Fig. 1. Provided adjacent the upper end of each card is an aperture 12 while a larger aperture 13 is located at a spaced distance from the bottom of the card.

One of the plurality of cards bears a question printed on its face, the question relating to a matter pertaining to history, geography, religion, sports, or any other desired subject. The question card is placed face up upon the playing surface to commence the game. For instance, as illustrated in Fig. 2, the first question card may inquire "Who was the first President of the United States?" From the remaining cards the player selects the card bearing what he thinks to be the correct answer to the question. This card is placed face up on the playing surface partially overlying the first card so that its upper edge is directly beneath the question. The card, in addition to bearing matter which may be the answer to the first question, also bears a second question. For instance, the card selected may bear the answer "George Washington" or John Quincy Adams" and directly beneath bear the question, "Date of birth?". From the cards remaining the player selects the card bearing what he believes to be the correct answer to the last question. The card, in addition to bearing matter which may be the answer to the last question, may, if desired, bear a third question. For instance, the card selected may bear the answer "Feb. 22, 1732" or "Feb. 12, 1735" and directly beneath bear another question "Place of birth?". The game may be designated to ask any number of questions, but for purpose of explanation but three cards are herein shown and referred to. It will be understood, of course, that there are several cards bearing incorrect answers to each question and the player must select the one he believes to be correct.

When, during the progress of the game, the player selects and plays a card bearing an answer but no question, he is aware that the game has been completed. He must now prove his answers to determine the correctness or incorrectness of his answers.

To test the accuracy of the answers, a pin or other suitable instrument 15 is placed in a wall, or, more conveniently, as shown in Fig. 3 of the drawing, between the cover 16 and a box bottom 17 so that the pin 15 will project outwardly. The cards previously selected by the player as being the correct answer cards are then suspended from the pin 15 by hanging the cards from the small apertures 12. If all of the answers have been correct, the larger apertures 13 adjacent the lower ends of the cards will register, as shown in Figure 3 of the drawing. This is due to the fact that, while the small apertures 12 may be spaced at different positions laterally and longitudinally of the cards, the larger apertures 13 of the correct answer cards are located at the same predetermined distance and direction from the center of gravity of each card when suspended from its small aperture 12. Thus, when suspended from the small apertures 12, the correct answer cards will have their larger apertures 13 aligned, proving the correctness of the answers. Obviously, the incorrect answer cards will have their large apertures 13 located at a different spacing from the center of gravity so that these apertures will not register with the corresponding apertures of the correct answer cards. Consequently, the player's score is computed according to the number of answer cards whose large apertures 13 are out of the correct common alignment.

What is claimed is:

In a set of playing cards bearing questions and answers printed on their faces, some of which answers are incorrect, each of said cards having an aperture provided in its face at a different position laterally and longitudinally from that of the other cards, and a second aperture provided in the face of each card at a different position laterally and longitudinally from that of the other cards at a spaced distance from said first aperture and at a spaced distance and direction from the center of gravity of said card when freely suspended from said first aperture, the second mentioned apertures of the cards bearing the correct answers being so located as to register when freely suspended from the first mentioned apertures and the corresponding apertures of the cards bearing the incorrect answers being so located as not to register when freely suspended from the first mentioned apertures.

JAMES J. HARKINS.